United States Patent
Le Mer (10) Patent No.: US 10,900,692 B2
(45) Date of Patent: Jan. 26, 2021

(54) DEFLECTOR FOR CONDENSATION HEAT EXCHANGER AND EXCHANGER PROVIDED WITH SUCH A DEFLECTOR

(71) Applicant: SERMETA, Morlaix (FR)

(72) Inventor: Joseph Le Mer, Plouezoch (FR)

(73) Assignee: SERMETA, Morlaix (FR)

( * ) Notice: Subject to any disclaimer, the term of this patent is extended or adjusted under 35 U.S.C. 154(b) by 168 days.

(21) Appl. No.: 16/076,656

(22) PCT Filed: Feb. 8, 2017

(86) PCT No.: PCT/EP2017/052753
§ 371 (c)(1),
(2) Date: Aug. 8, 2018

(87) PCT Pub. No.: WO2017/137437
PCT Pub. Date: Aug. 17, 2017

(65) Prior Publication Data
US 2019/0049148 A1 Feb. 14, 2019

(30) Foreign Application Priority Data

Feb. 9, 2016 (FR) .................... 16 51014

(51) Int. Cl.
*F24H 1/43* (2006.01)
*F24H 8/00* (2006.01)
(Continued)

(52) U.S. Cl.
CPC ............... *F24H 1/43* (2013.01); *F24H 8/00* (2013.01); *F24H 9/0026* (2013.01);
(Continued)

(58) Field of Classification Search
CPC . F24H 1/43; F24H 1/44; F24H 9/0021; F24H 9/0031; F24H 9/0026; F24H 8/00;
(Continued)

(56) References Cited

U.S. PATENT DOCUMENTS 1,654,551 A * 1/1928 Muhleisen ............... F28D 7/04
392/479
2,131,265 A * 9/1938 Bichowsky ............... F28D 9/04
165/165
(Continued)

FOREIGN PATENT DOCUMENTS

EP 1600720 A2 11/2005
FR 2323119 A1 4/1977
(Continued)

OTHER PUBLICATIONS

Preliminary Research Report received for French Application No. 1651014, dated Oct. 28, 2016, 3 pages (1 page of French Translation Cover Sheet and 2 pages of original document).
(Continued)

*Primary Examiner* — Jianying C Atkisson
*Assistant Examiner* — Jose O Class-Quinones
(74) *Attorney, Agent, or Firm* — Womble Bond Dickinson (US) LLP (57) ABSTRACT

A deflector for a condensation heat exchanger and to an exchanger provided with such a deflector. The deflector includes two front and rear cups with inner surfaces at the bottom designed in relief so as to have at least one circulation groove. The two cups are assembled on either side of a central partition so that each groove forms, with the partition, a channel in which a heat-transfer fluid is intended to circulate. The channels of the front and rear cups are connected via an opening bored into the central partition, so that the heat transfer fluid can circulate from an inlet coupling to an outlet coupling of the deflector, through the channels by flowing on either side of the central partition.

11 Claims, 9 Drawing Sheets

(51) Int. Cl.

| | | |
|---|---|---|
| *F24H 9/00* | (2006.01) | |
| *F28D 7/00* | (2006.01) | |
| *F28D 7/02* | (2006.01) | |
| *F28D 9/00* | (2006.01) | |
| *F28F 3/12* | (2006.01) | |
| *F28D 7/04* | (2006.01) | |

(52) U.S. Cl.
CPC ........... *F28D 7/0091* (2013.01); *F28D 7/024* (2013.01); *F28D 9/0012* (2013.01); *F28D 9/0093* (2013.01); *F28D 7/04* (2013.01); *F28F 3/12* (2013.01); *Y02B 30/00* (2013.01)

(58) Field of Classification Search
CPC .... Y02B 30/102; F28F 3/12; F28F 2250/104; F27B 2007/048; F28D 9/0093; F28D 9/0012; F28D 7/024; F28D 7/0091; F28D 7/04; F28D 1/0366; F28D 1/0375; F28D 9/0043; F28D 9/0068; F28D 9/0075; F28D 2020/0069; F28D 2021/0024
See application file for complete search history.

(56) References Cited

U.S. PATENT DOCUMENTS

| | | | | | |
|---|---|---|---|---|---|
| 3,269,405 | A * | 8/1966 | Uerlichs | ............... | F16K 49/007 137/340 |
| 3,848,665 | A * | 11/1974 | Uerlichs | .................. | C21B 9/12 165/168 |
| 4,285,397 | A * | 8/1981 | Ostbo | .................. | F28D 9/0043 165/163 |
| 4,403,572 | A * | 9/1983 | Gerstmann | ........... | F24D 11/002 122/20 B |
| 4,445,569 | A * | 5/1984 | Saho | ..................... | F28D 9/0012 165/154 |
| 4,655,174 | A * | 4/1987 | Fillios | ..................... | F24H 1/24 122/134 |
| 5,912,088 | A * | 6/1999 | Ernst | .................. | H01M 8/0271 429/479 |
| 6,007,933 | A * | 12/1999 | Jones | ................... | H01M 8/021 204/282 |
| 6,071,635 | A * | 6/2000 | Carlstrom, Jr. | ..... | H01M 8/0223 429/413 |
| 6,093,502 | A * | 7/2000 | Carlstrom, Jr. | ... | H01M 8/04156 429/413 |
| 6,253,835 | B1 * | 7/2001 | Chu | ......................... | F28F 3/12 165/104.33 |
| 7,892,847 | B2 * | 2/2011 | Ito | ....................... | B01D 15/1807 165/152 |
| 8,163,243 | B1 * | 4/2012 | Burke | .................. | B01D 5/0015 422/120 |
| 2001/0045269 | A1 * | 11/2001 | Yamada | ............... | F28D 9/0012 165/80.1 |
| 2007/0000653 | A1 * | 1/2007 | Alessandrini | ............ | F24H 8/00 165/163 |
| 2007/0209606 | A1 * | 9/2007 | Hamada | .................. | F28D 7/024 122/18.1 |
| 2011/0185985 | A1 * | 8/2011 | Ahmady | ................... | F28D 7/00 122/18.1 |
| 2011/0303400 | A1 | 12/2011 | Scearce | | |
| 2012/0055421 | A1 * | 3/2012 | Rausch | ................... | F28D 7/024 122/231 |
| 2012/0061063 | A1 * | 3/2012 | Luo | .......... | F28F 13/12 165/163 |
| 2012/0312513 | A1 * | 12/2012 | Le Mer | ..................... | F24H 8/00 165/159 |
| 2017/0102164 | A1 * | 4/2017 | Giannoni | ................... | F28F 9/20 |
| 2019/0024942 | A1 * | 1/2019 | Le Mer | ..................... | F24H 8/00 |

FOREIGN PATENT DOCUMENTS

| | | | |
|---|---|---|---|
| FR | 2843189 A1 | 2/2004 | |
| FR | 2913105 A1 | 8/2008 | |
| FR | 2942866 A1 | 9/2010 | |
| WO | WO-2011002711 A1 * | 1/2011 | ............... F24H 1/38 |

OTHER PUBLICATIONS

International Search Report and Written Opinion received for PCT Patent Application No. PCT/EP2017/052753, dated May 11, 2017, 17 pages (8 pages of English Translation and 9 pages of Original Document).

\* cited by examiner

PRIOR ART

DEFLECTOR FOR CONDENSATION HEAT EXCHANGER AND EXCHANGER PROVIDED WITH SUCH A DEFLECTOR

GENERAL TECHNICAL FIELD

The invention is situated in the field of water tube condensation heat exchangers.

The present invention relates more precisely to a deflector for this type of exchanger and an exchanger provided with a deflector.

PRIOR ART

Figure 1:
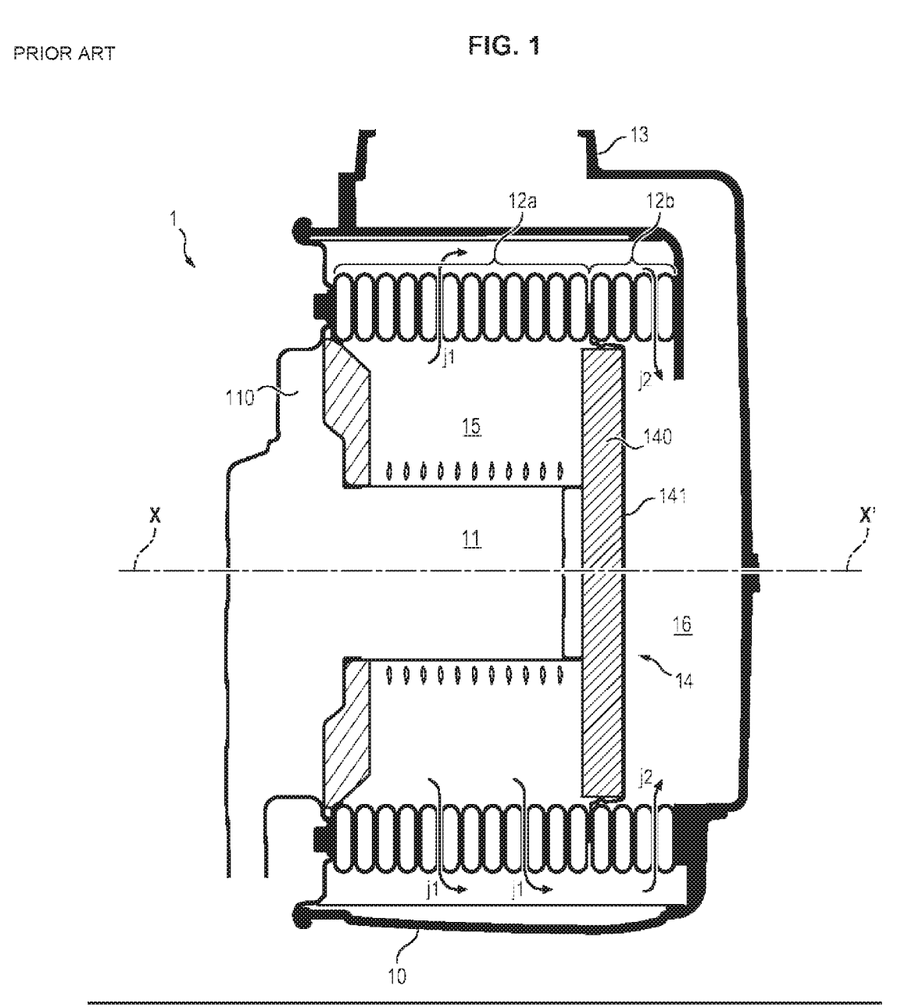
FIG. 1 shows a prior art condensation heat exchanger.

One exemplary embodiment of a condensation heat exchanger according to the state of the art is illustrated in the appended FIG. 1, which shows a view of it in longitudinal section.

This exchanger 1 comprises a gas-tight shell 10, which delimits an enclosure inside which are mounted two bundles of heat exchange tubes 12a, 12b and means 11 of producing hot gas or conveying hot gases, such as a burner (particularly using gas or fuel oil) attached to cover 110 which blocks the front face of the exchanger.

The shell 10 has approximately a generally cylindrical shape with longitudinal axis X-X'.

The two bundles 12a, 12b are coaxial helical tube bundles with axis X-X', set end to end, the first 12a serving as the primary exchanger and the second, 12b, as the secondary exchanger. These tubes are made of a material with good thermal conductivity, such as metal. Means not shown in the figures are provided to cause circulation inside said tubes of a heat-transfer fluid, such as water, to be heated.

The shell 10 of the exchanger also comprises a combustion gas discharge sleeve 13.

A deflector 14 is interposed between the two tube bundles 12a, 12b.

This deflector 14 comprises a disk 140 made of heat insulating refractory to heat material, based on silica fibers for example, supported by a disk-shaped fitting 141 in the form of a thin plate of greater diameter. The peripheral annular edge of the fitting 141 is inserted and attached in a gas-tight manner between the two ends of the bundles 12a and 12b.

The deflector 14 thus divides the enclosure delimited by the shell 10 into a chamber 15, called the "combustion" chamber, containing the burner 11 and a chamber 16, called the "condensation" chamber, which extends from this deflector 14 to the sleeve 13.

The deflector 14 plays two roles, namely modifying the trajectory of the hot gases produced by the burner 11 and thermally isolating the condensation chamber 16.

Thus the hot gases produced by the burner 11 are forced to pass through the gaps situated between the turns of the tubes of the primary bundle 12a, from the interior to the exterior (arrows j1), then between the turns of the tubes of the secondary bundle 12b, this time from the exterior to the interior (arrows j2).

Furthermore, the temperature of the deflector 14 on the side of the combustion chamber 15 is on the order of 900° C. to 1000° C., while on the side of the condensation chamber 16 it is only on the order of 100° C. to 150° C.

This temperature, however, should be lower to improve the overall efficiency of the exchanger 1.

In addition, the refractory material of the disk 140 has a tendency to radiate into the combustion chamber 15 during operating phases of the burner 11, which participates in the creation of pollutants such as oxides of nitrogen (NOx) and carbon monoxide (CO), these pollutants then being discharged in the smoke that leaves the exchanger.

Finally, the life span of the disk 140 is less than that of the tube bundles 12a, 12b, which entails its replacement after a few years, during maintenance of the exchanger, which increases its operating costs.

PRESENTATION OF THE INVENTION

The invention has as its goal to resolve the aforementioned disadvantages of the prior art and in particular:
to improve the efficiency of the heat exchanger for a given power,
to reduce emissions of pollutants, such a nitrogen oxides (NOx),
to eliminate the ceramic disk of the deflector, to avoid having to replace it,
to reduce operating costs.

To this end, the invention relates to a deflector for a condensation heat exchanger.

In conformity with the invention, this deflector comprises two cups, called "front" and "rear," a central partition, an inlet connector and an outlet connector, each cup comprising a bottom surrounded by a peripheral rim, the interior face of the bottom of each cup being configured in relief so as to have at least one groove, called a "circulation" groove, which extends over at least a portion of said bottom, the two cups being assembled to one another in a fluid-tight manner, on either side of said central partition, so that their respective concave portions are oriented toward one another and each circulation groove forms with said central partition at least one channel called a "circulation" channel, wherein a heat-transfer fluid, such as water, is designed to circulate, the two cups and the central partition being made of a material with good thermal conductivity, the first of the two ends of each circulation channel of the front cup, respectively the rear cup, being in fluid communication with the outlet connector, respectively the inlet connector, of said deflector and the second end of each circulation channel of the front cup being connected to the second end of a channel of the rear cup, through an opening drilled in said central partition, so that said heat-transfer fluid can circulate from the inlet connector to the outlet connector through the set of circulation channels, by flowing on either side of said central partition.

Thanks to these features of the invention, the heat-transfer fluid which circulates between the rear wall and the central partition cools said rear wall, which greatly contributes to reducing the temperature of the smoke which licks (comes into contact with) this rear wall before leaving the exchanger. This allows the overall efficiency of the exchanger to be increased.

Furthermore, the elimination of the refractory material disk allows, on the one hand, eliminating its radiating effect and therefore substantially reducing emissions of polluting particles, and on the other hand, increasing the life span of the exchanger because it is no longer necessary to replace it.

According to other advantageous and non-limiting features of the invention, taken alone or in combination:
the circulation channel or channels of the front cup and the circulation channel or channels of the rear cup are symmetrical with respect to a plane of symmetry passing through said central partition, so that the heat-transfer fluid circulates in the circulation channel or channels of the front cup in counter-flow to the direction wherein it circulates in a channel or the channels of the rear cup situated facing it:

the bottom of the front cup and the bottom of the rear cup are configured in relief so as to form a peripheral annular groove, called respectively the "collection groove" and the "distribution groove" which extend around said circulation grooves, the two cups being assembled on either side of the central partition, so that the collection and distribution grooves form with said central partition respectively a collection channel and a distribution channel, the inlet connector leading into said distribution channel and the outlet connector leading into said collection channel, said distribution and collection channels also each being provided with a deflecting partition which allows the heat-transfer fluid to be guided from the distribution channel toward the circulation channels of the rear cup and respectively from the circulation channels of the front cup toward the collection channel;

the circulation channel or channels are in the form of a spiral;

the circulation channel or channels are in the form of a coil;

the circulation channel or channels have a rectilinear shape;

the front and rear cups comprise at least two circulation channels disposed wound side by side in a spiral and inside which the heat-transfer fluid circulates in parallel, the first ends of said circulation channels of the front cup lead into the collection channel and the first ends of said circulation channels of the rear cup lead into the distribution channel;

The invention also relates to a condensation heat exchanger comprising at least one bundle consisting of a tube or a group of tubes disposed end to end, wound in a helix, this tube being made of a material with good thermal conductivity, this or these bundle(s) being fixedly mounted in the interior of a gas-tight shell, this shell being provided with a gas discharge sleeve, means being provided to cause circulation of at least one heat-transfer fluid, such as water, to be heated, inside the or said bundles of tube(s), the exchanger also comprising a deflector disposed at the end of said bundle of at least one tube or interleaved between two of these adjoining bundles, and means for conveying or means of producing hot gases.

In conformity with the invention, said deflector is as previously mentioned and the deflector and said means of conveying or means of producing hot gases are disposed so that said hot gases lick the exterior face of the front cup of the deflector, then pass radially or approximately radially through the bundle of tubes or of groups of tubes situated upstream of said deflector, passing through the gaps separating its turns, from the interior to the exterior, and finally lick (come into contact with) the upper face of the rear cup of said deflector, before being discharged through said gas discharge sleeve.

According to other advantageous and non-limiting features of the invention, taken alone or in combination:

the outlet connector of said deflector is in fluid communication with at least one of the tube bundles, so that it is the same heat-transfer fluid which circulates in the deflector and in the tube bundle(s);

the outer diameter of the deflector is identical or substantially identical to the external diameter of the tube bundle(s) and the length between the two ends of the inlet connector and of the outlet connector of the deflector is identical or substantially identical to the length between the two ends of the orifices of the tube of each tube bundle;

the deflector is interleaved between two bundles of tubes or of groups of tubes, the bundle located upstream of the deflector serving as a primary exchanger and the bundle situated downstream of the deflector with respect to the flow direction of hot gases serving as a secondary exchanger, so that the hot gases lick the exterior face of the front cup of the deflector, then pass radially or approximately radially through the bundle of tubes or of groups of tubes of the primary exchanger by passing through the gaps separating its turns, from the interior to the exterior, the subsequently passe radially or approximately radially through the bundle of tubes or of groups of tubes of the secondary exchanger by passing through the gaps separating its turns, from the exterior to the interior, and finally lick the exterior face of the rear cup of said deflector before being discharged through said gas discharge sleeve;

the wall of the tube(s) of a bundle of tubes has a flattened oval straight section of which the major axis is perpendicular, or approximately perpendicular, to that of the helix, while the width of the gap separating two adjoining turns is constant and smaller than the thickness of said straight section;

PRESENTATION OF THE FIGURES

Other features and advantages of the invention will appear from the description which will now be made of it, with reference to the appended drawings, which represent by way of indication but without limitation one possible embodiment of it.

FIG. 4 is a partial section view of the deflector according to the invention taken along the section plane passing through the line IV-IV in FIG. 2, FIG. 4a is a detail view of FIG. 4, FIGS. 5a and 5b are front views of the interior of two cups which form the deflector conforming to the invention.

DETAILED DESCRIPTION OF THE INVENTION

A first embodiment of the deflector 2 conforming to the invention will now be described in more detail.

Figure 3:
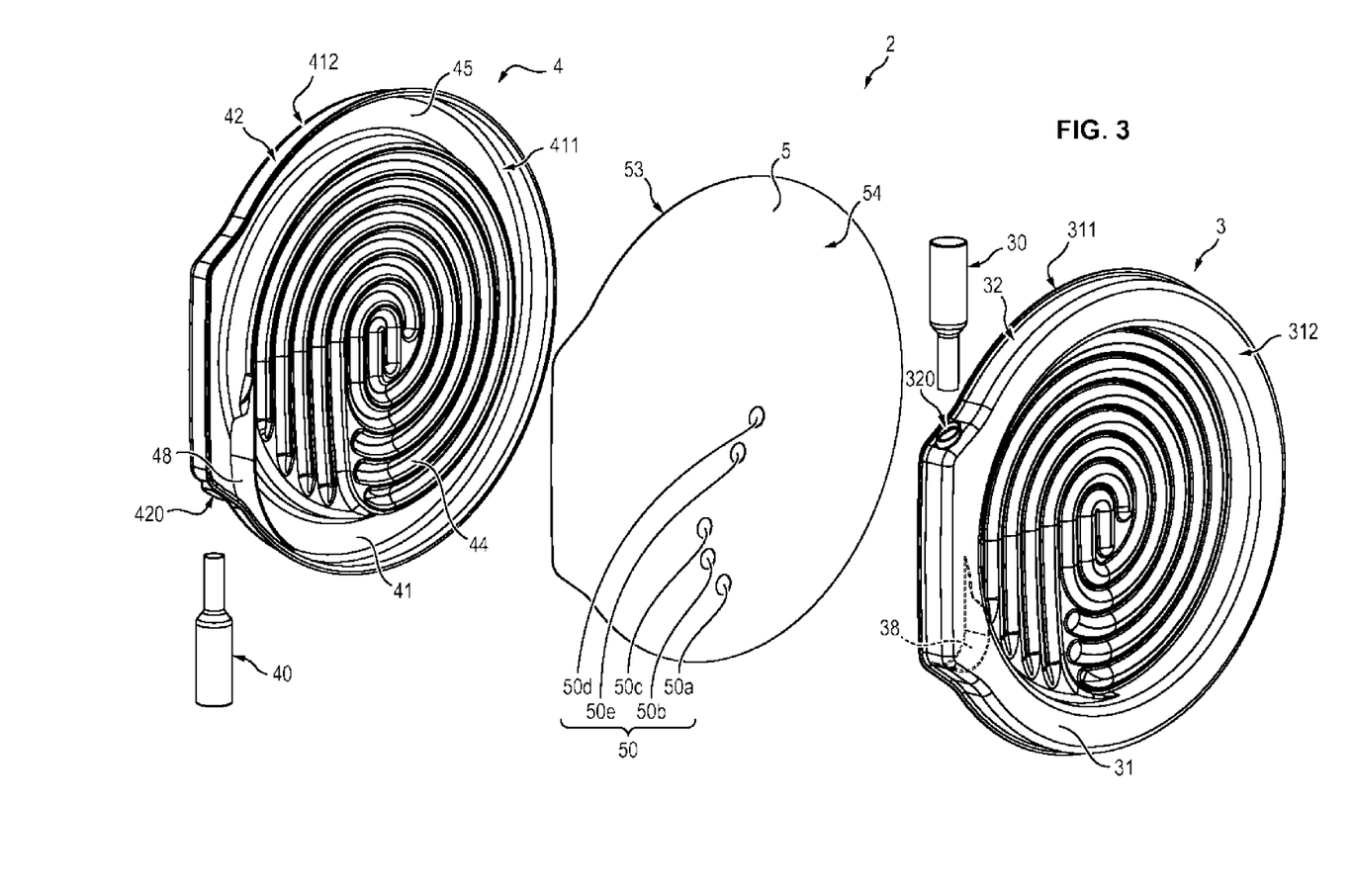
FIG. 3 is an exploded view in perspective of the different element constituting the deflector of FIG. 2.

Referring to FIG. 3, it can be seen that the deflector 2 comprises two cups, called "front" 3 and "rear" 4, a central partition 5 and two connectors, namely an inlet connector 40 and an outlet connector 30.

The front cup is thus designated because it is designed to be oriented toward the burner, when the deflector 2 is placed in a heat exchanger.

The different element constituting the deflector 2 are made of a material with good thermal conductivity, metal for example, preferably of stainless steel. They could also be made of aluminum for example.

The rear cup 4 comprises a bottom 41 surrounded by a peripheral rim 42 which is perpendicular or substantially perpendicular to it.

The bottom 41 has a circular, or approximately circular shape. The peripheral rim 42 follows the contour of the bottom 41.

The inlet connector 40 is a tube. It is advantageously sleeved and welded through an opening 420 made in the rim 42.

The bottom 41 has an interior face 411 and an exterior face 412.

Figure 2:
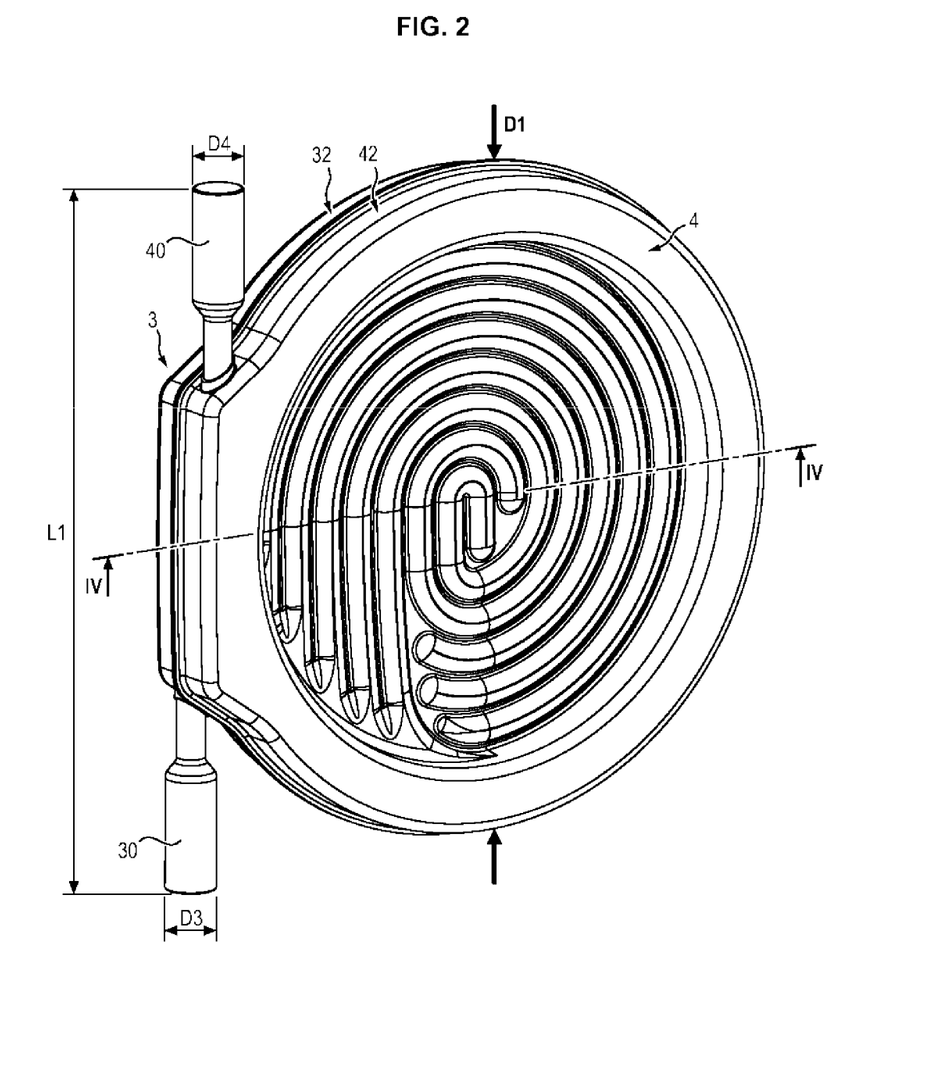
FIG. 2 is a perspective view of the deflector conforming to the invention.

The interior face 411 is configured in relief so as to have at least one groove 44 called a "circulation" groove, (five in number for example, wound in a spiral in FIGS. 2 and 3), which leads to the concave side of the rear cup 4. The number and the configuration of these grooves 44 can vary as will be described later. Advantageously, the transverse section of the circulation groove 44 is semi-circular or substantially so, as can be seen in FIG. 4.

Figures 4, 4A:
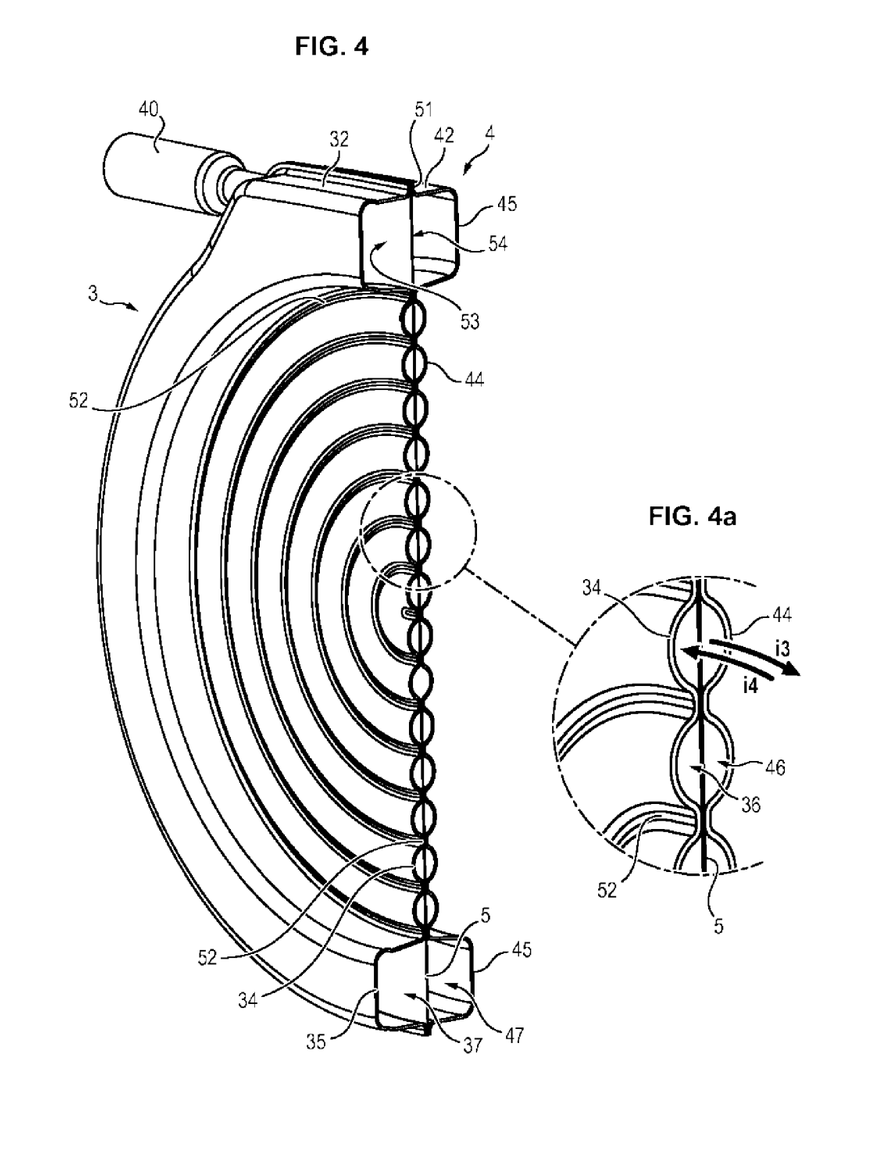

In addition, advantageously, the interior face 411 is also configured in relief so as to have along the peripheral rim 42 an annular groove 45, called a "distribution" groove, which also leads to the concave side of the rear cup 4 and which has greater dimensions that the circulation groove(s) 44 (particularly deeper or larger), as can be seen in FIG. 4.

The front cup 3 is symmetrical with respect to the rear cup 4 with the exception of a deflecting partition which will be described later. It will therefore not be described in detail. The same elements bear the same numerical reference symbols, the first numeral 4 being replaced by the numeral 3. Thus the front cup 3 comprises a bottom 31, a rim 32, an opening 320 for mounting the outlet connector, an interior face 311, an exterior face 312, at least one circulation groove 34 and a peripheral annular groove called a "collection" groove 35, these grooves being visible in FIG. 4.

Preferably, the cups 3 and 4 are manufactured by stamping from sheet metal. The bottom 31, 41 is therefore deformed and the grooves formed on the interior face 311, 411 appear in protrusion on the exterior face 312, 412.

The central partition 5 is preferably manufactured from thin sheet metal. It has a contour which follows that of the bottom 31, 41 of the cups 3 and 4. It is drilled with a plurality of openings 50, the role of which will be described later.

The partition 5 has a front face 53 and a rear face 54.

The two front 3 and rear 4 cups, are assembled to one another, on either side of the central partition 5, in a fluid-tight manner, their respective concave portions being oriented toward one another.

As can be seen in FIG. 4, the ends of the lateral peripheral rims 32, 42 of the two cups 3, 4 are thus welded to the circumference of the central portion 5 by a welding bead 51.

In addition, the assembly is carried out so that the two edges (contours) of each of the circulation grooves 34 or 44 are in contact respectively with the front face 53 and the rear face 54 of the flat central partition 5 and welded to it, by points or by a weld bead 52. The same is true for the two distribution grooves 35, 45.

In the exemplary embodiment shown in FIGS. 2 to 5b, where the cups 3, 4 are symmetrical on either side of the plane of the central partition 5, it is noted that the weld 52 connects from side to side the two cups and the partition 5, which simplifies the method of manufacture.

The two cups 3, 4 and the central partition 5 thus assembled, the circulation grooves 34, 44 define (delimit) with said partition 5, circulation channels 36, respectively 46, while the collection 35 and distribution 45 grooves define with this same partition 5 collection 37 and distribution 47 channels, (see FIGS. 4 and 4a).

One particular implementation of the deflector will now be described in connection with FIGS. 5a and 5b.

Figure 5A:
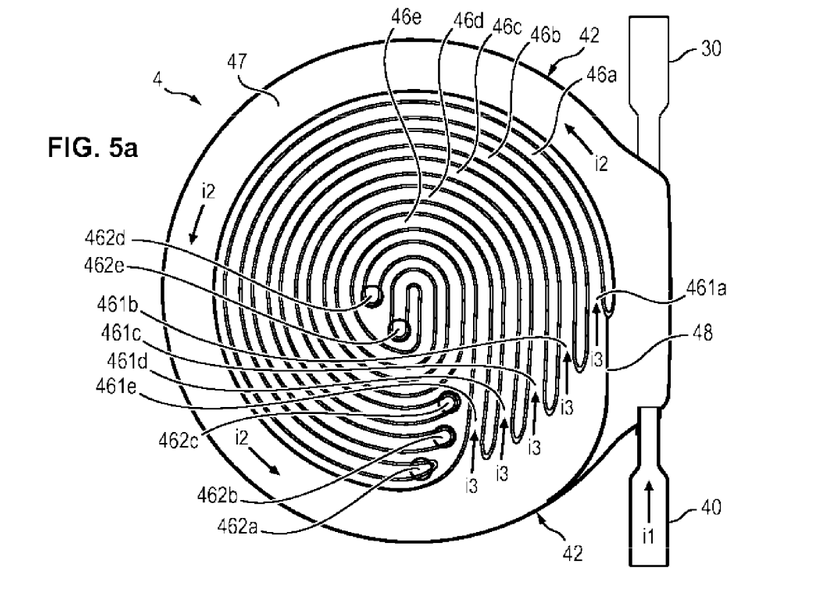

In FIG. 5a, it can be seen that the cup 4 comprises five adjoining circulation grooves, wound together in a spiral, from the peripheral distribution groove toward the center of the cup. They form, with the partition 5 not shown in the figure, five circulation channels 46a, 46b, 46c, 46d and 46e, channel 46a is situated most externally.

These five circulation channels 46a, 46b, 46c, 46d and 46e lead into the distribution channel 45 at one of their two ends, called the "first end," these first ends being given the respective reference symbols 461a, 461b, 461c, 461d and 461e. Their respective opposite ends have reference symbols 462a, 462b, 462c, 462d and 462e.

A deflecting partition 48 also connects an external point of the end 461a of the most external channel 46a to the rim 42.

It is disposed so as to separate the flow entering through the inlet connector 40, from the flow which goes around the distribution channel 47 and which must be distributed into the channels 46a to 46e.

Figure 5B:
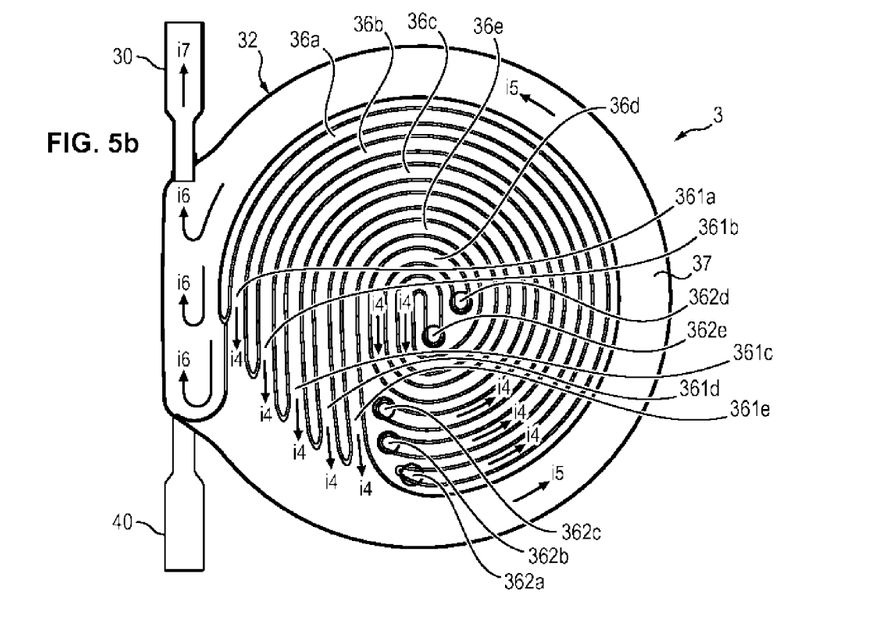

In FIG. 5b, it is possible to see the cup 3 which is quasi-symmetrical to the cup 4 and which will therefore not be described in detail. The first and second ends of the five circulation channels 36a, 36b, 36c, 36d and 36e have the respective reference symbols 361a, 361b, 361c, 361d, 361e and 362a, 362b, 362c, 362d, 362e and the deflecting partition 38.

This partition 38 has a shape that is slightly different from the partition 48. It connects the rim 32 to an external point of the first end 361 of the most external channel 36a but is disposed so as to separate the flow leaving the different circulation channels 36a to 36e from the flow collected in the collection channel 37 after it has gone around this channel so as to direct the flow toward the outlet connector 30.

Five openings 50a, 50b, 50c, 50d, 50e are also drilled in the central partition 5 facing respective second ends 462a, 462b, 462c, 462d, 462e and 362a, 362b, 362c, 362d, 362e of the different channels (see FIG. 3).

The circulation of the heat-transfer fluid such as water inside the deflector 2 will now be described.

The fluid penetrates into the deflector by the inlet connector 40 (arrow i1), circulates in the totality of the distribution channel 47 (arrows i2), then is distributed into the five circulation channels 46a, 46b, 46c, 46d and 46e inside which circulation occurs in parallel (arrows i3). This contributes to reducing head losses. The fluid is thus guided thanks to the curved deflecting partition 48.

Once the fluid has reached the second ends 462a, 462b, 462c, 462d, 462e, it passes through the partition 5 via the respective openings 50a, 50b, 50c, 50d, 50e, penetrates into the five circulation channels 36a, 36b, 36c, 36d and 36e (arrows i4 in FIG. 5b) and leaves them at their respective first ends 361a, 361b, 361c, 361d, 361e. The heat-transfer fluid is then collected in the collection channel 37 (arrows i5), strikes the deflecting partition 37 from which it is driven back (arrows i6) to the outlet connector 30 from which it departs (arrow i7).

Due to the symmetrical shape of the channels of the cups 3, 4, it is therefore noted that the fluid circulates counter-flow (arrows i3, i4) in each pair of channels 36a, 46a to 36e, 46e situated on either side of the central partition 5, (see also FIG. 4a).

Figure 10:
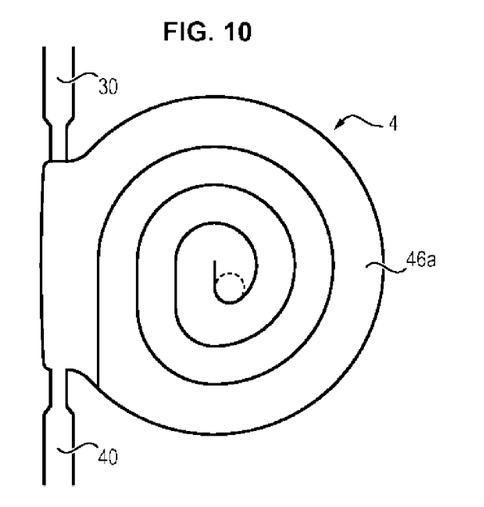
FIGS. 10, 11 and 12 are schematic front views of three other embodiments of deflectors conforming to the invention.

The embodiment just described is not limiting, and there could be more or fewer than five circulation channels. In FIG. 10, for example, the cup 4 comprises only a single circulation channel 46a spirally wound on itself.

Figure 11:
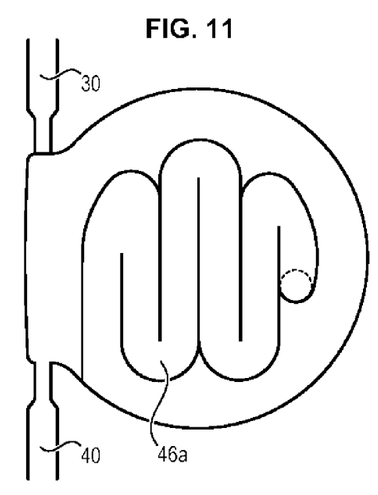
Figure 12:
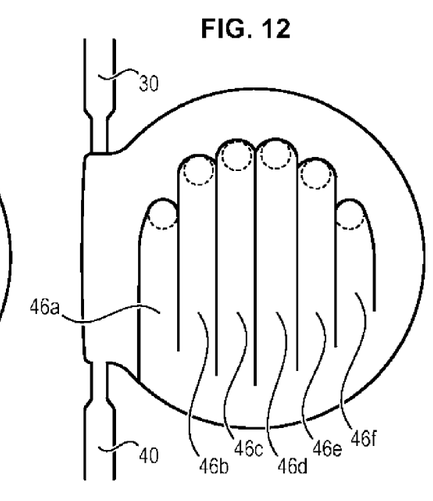

Referring to FIGS. 11 and 12, it can also be seen that the track of the circulation channels on the bottom of the cups is not limited to a spiral shape, but that any other shape is possible, for example a coil (FIG. 11) or rectilinear shape (for example, six parallel channels 46a to 46f in FIG. 12).

Regardless of the shape of the circulation channels, these are formed so as to extend over at least a portion of the bottoms 31, 41 and preferably over the totality of the surface in the interior of the collection and distribution channels.

Finally, it will be noted that the symmetrical distribution of the channels on either side of the partition 5 is advantageous for simplifying welding, but not obligatory. The circulation channel(s) formed in the front cup 3 could thus have a different particular shape from the circulation channel (s) formed in the rear cup 4.

The deflector described previously is designed to be installed in a condensation heat exchanger.

A first embodiment of such an exchanger will now be described in connection with FIGS. 6 to 9.

Constitutive elements identical to those described for the exchanger 1 of the prior art in connection with FIG. 1 will not again be described in detail and carry the same numerical reference symbols. The exchanger conforming to the invention simply carries the reference symbol 1'. The two portions 10a, 10b of the shell 10 are shown in the separated position in FIG. 6.

Figure 6:
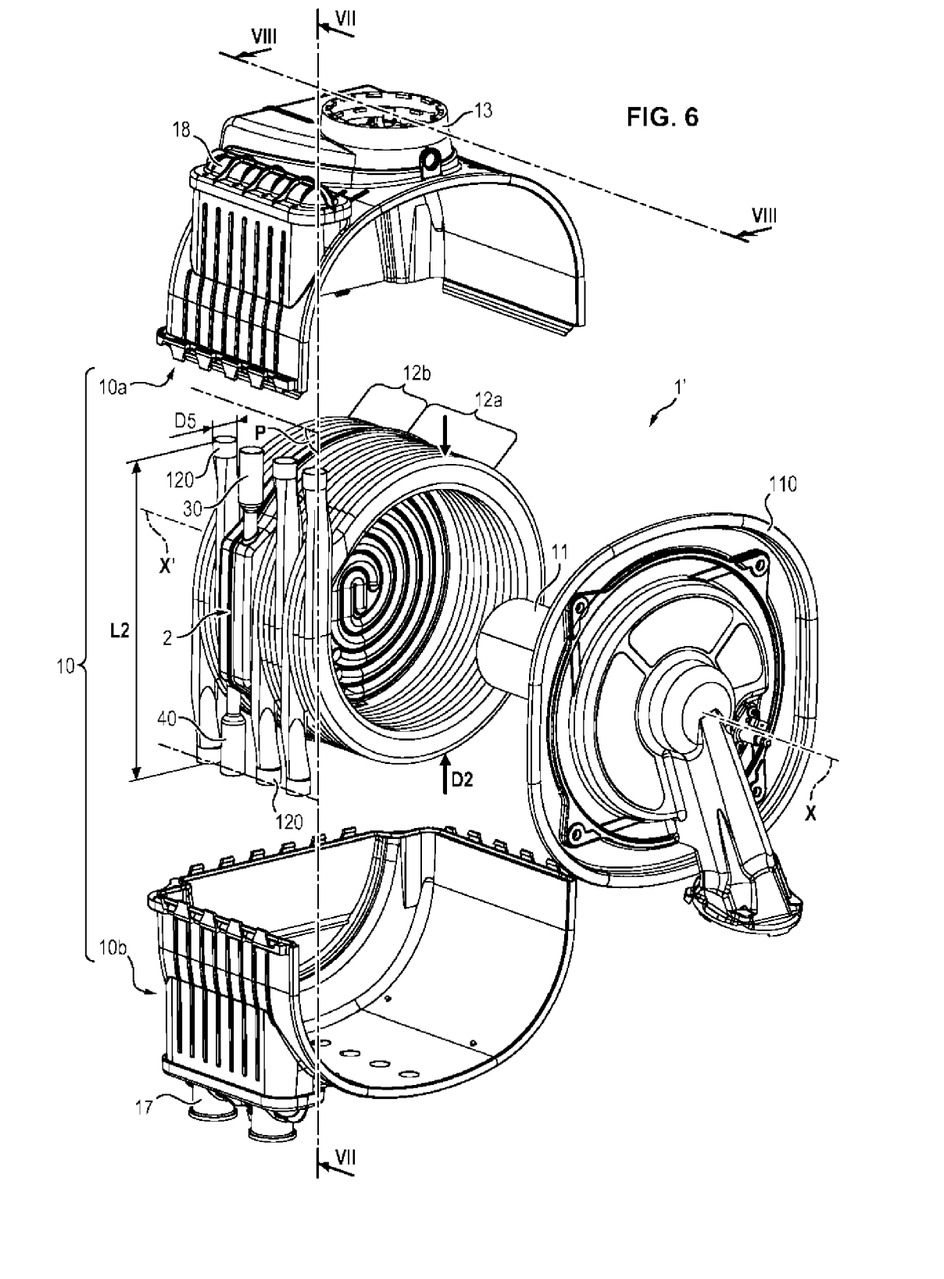
FIG. 6 is an exploded view, in perspective, of the different element constituting a heat exchanger conforming to a first embodiment of the invention, this heat exchanger being provided with a deflector also conforming to the invention.
Figure 7:
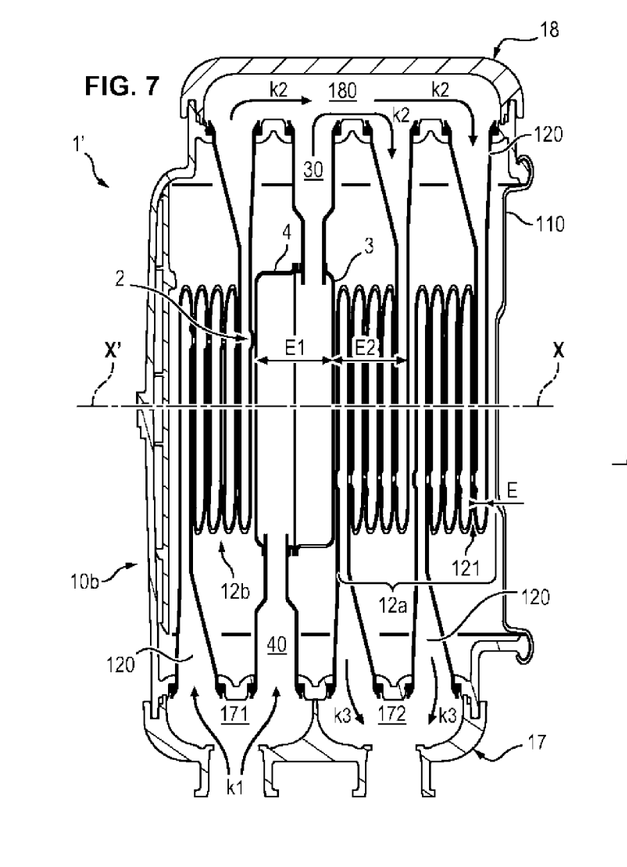
FIGS. 7 and 8 are views in longitudinal vertical section of the exchanger of FIG. 6, taken respectively in the planes passing through the lines VII-VII and VIII-VIII of FIG. 6.
Figure 8:
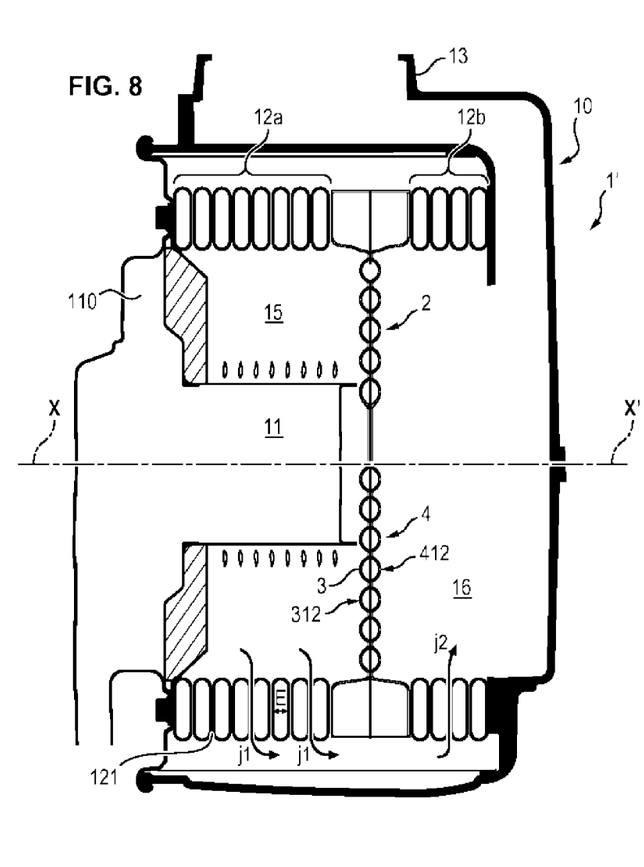

The exchanger shown in FIGS. 6 to 8 comprises two coaxial tube bundles, placed end to end, of which one 12a serves as a primary exchanger and the other 12b as a secondary exchanger. The bundle 12a comprises two adjacent tubes forming a helical winding with axis X-X'. The bundle 12b comprises a single tube also wound in a helix, with axis X-X'.

The tubes are made of a material with good thermal conductivity.

Advantageously, the tubes have a flattened oval straight section of which the long sides are perpendicular to the axis X-X'.

Advantageously, bosses (not shown) provided in the large faces of the tubes play the role of spacers; they allow a gap 121 of calibrated value, substantially constant and smaller than the thickness E of the straight section of the tubes (see FIGS. 7 and 8), to be delimited between each turn of the winding.

Each tube possesses straight end portions, i.e. with a rectilinear axis, and with a progressively variable section of which the discharging end portion (orifice) is circular.

The three tubes forming the different bundles 12a 12b are identical, have the same length, the same tube diameter and the same helical winding diameter as can be seen in FIG. 6. They are positioned in the envelope 10a, 10b so that the longitudinal axes of their respective orifices 120 extend into the same plane P.

Advantageously, the deflector 2 conforming to the invention is dimensioned so that its outside diameter D1 is identical or substantially identical to the outer diameter D2 of the tube bundles 12a, 12b. Likewise, also advantageously, the exterior outer diameters D3 and D4 of the outlet 30 and inlet 40 connectors (see FIG. 2) are identical to the outlet diameter D5, D6 of the orifices 120 of the tube bundles 12a, 12b. Finally, the length L1 between the two ends of the inlet 40 and outlet 30 connectors (see FIG. 2) is advantageously identical to the length L2 between the two ends of the two orifices 120 of each tube winding of the bundles 12a, 12b (see FIG. 6).

Also preferably, the thickness E1 of the deflector 2 at its thickest portion (at the collection 35 and distribution 45 channels) is identical or substantially identical to the thickness E2 of one winding of the helical tube (see FIGS. 7 and 8).

Thus, the geometry of the deflector 2 allows placing it in the exchanger 1' instead of a tube, which it replaces advantageously at the same time as the deflector 14 and its refractory insulator of the prior art.

The connecting of the tube bundles 12a, 12b and of the deflector 2 to the means allowing the heat-transfer fluid to circulate is carried out as described hereafter in connection with FIGS. 6 and 8.

The shell 10 comprises two lateral collectors 17, 18, which allow the branching of the exchanger 1', in the conventional manner, on a conveying duct for the cold fluid to be heated, the transfer of this fluid from one tube to another, and the discharge of the heated fluid.

The inlet and outlet orifices of the tubes are crimped in a sealed manner into the appropriate openings provided in the shell 10, to lead into the interior of the collectors 17, 18.

The inlet-outlet collector 17 comprises an inlet chamber 171 and an outlet chamber 172 capable of being connected to a pipe for conveying fluid to be heated and, respectively, a pipe for discharging the heated fluid.

The inlet chamber 171 is connected to the inlet orifice 120 of the tube bundle 12b and to the inlet connector 40, into which the fluid to be heated enters. The outlet chamber 172 is connected to the outlet orifices 12 of the tube bundle 12a through which the heated fluid departs.

The opposite collector 18 has a single transfer chamber 180, which is connected both to the orifices 120 of the bundles 12a, 12b and to the outlet connector 30. The connector 30 is therefore in fluid communication with the bundle 12a.

The flow (arrows k1) entering the chamber 17 is subdivided into two flows each of which passes through the bundle 12b and the deflector 2, re-join in chamber 180 and are transferred (arrows k2) into the tubes of bundle 12a to lead (arrows k3) into the chamber 172 and then leave it.

In the aforementioned embodiment, it is the same heat-transfer fluid which circulates in the deflector 2 and in the tube bundles 12a and 12b; however, it would also be possible to have two distinct feeds of heat-transfer fluid, one for the deflector 2 and the other for the tube bundles 12a, 12b.

The hot gases follow the same path as that explained in connection with FIG. 1. They circulate counter-flow to the heat-transfer fluid (see arrows j1, j2 in FIG. 8).

Figure 9:
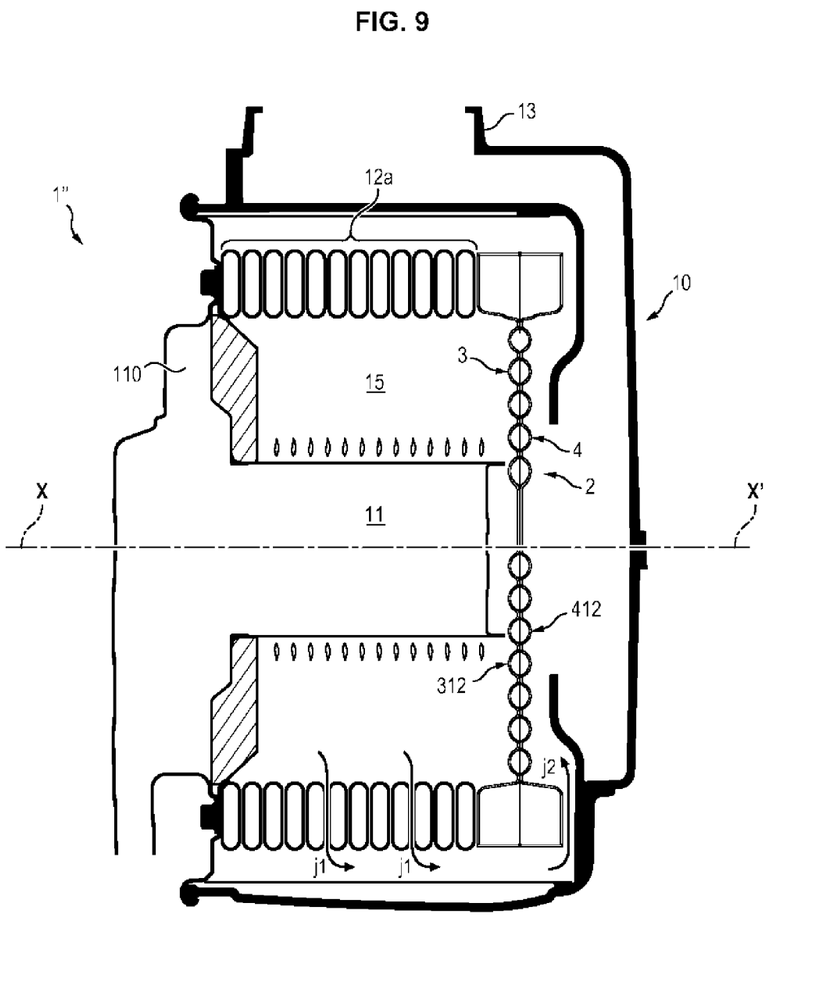
FIG. 9 is a longitudinal section view of a heat exchanger according to a second embodiment of the invention.

Another embodiment of the exchanger, with reference symbol 1", will now be described in connection with FIG. 9. It differs from the exchanger 1' in that it does not comprise tube bundle 12b serving as a secondary heat exchanger downstream of the deflector 2, (with respect to the circulation direction of the hot gases). As for the rest, it is identical and the same elements have the same numerical reference symbols.

In this case, the hot gases, after having licked the exterior face 312 of the front cup 3 and passed through the gaps 121 between the turns of the primary bundle 12a, leave directly while licking the exterior face 412 of the rear cup 4, in contact with which they are cooled, before escaping through the sleeve 13.

The deflector 2 which was just described could also be used in a heat exchanger with two bundles of tubes, one disposed around a burner, the other beside it in parallel, as describe in document FR 2 843 189 or in an exchanger with three bundles of tubes, two disposed around the burner, the other beside them in parallel with the first two, as described in document FR 2 913 105.

In all the embodiments which have thus been described, the deflector conforming to the invention has the advantage that its two exterior surfaces 312, 412 are cooled by a perfectly controlled water circulation in all the circulation channels 36a to 36e and 46a to 46e. Any hot point is thereby avoided.

In addition, the departing gases reduce their temperature substantially in contact with the exterior surface 412 of the rear cup 4. The exit temperature of the gases (smoke) is thus close or equal to the temperature of the water which enters the exchanger (near 30° C.). The condensation rate in the combustion 15 and condensation 16 chambers is intensified.

Finally, the nitrogen oxides (NOx) emissions are lower by approximately 20% than those from a heat exchanger with a refractory material deflector of the prior art.

The invention claimed is:

1. A deflector for a condensation heat exchanger, comprising a front cup, a rear cup, a flat central partition, an inlet connector and an outlet connector, each cup comprising a bottom surrounded by a peripheral rim, an interior face of the bottom of each cup being configured in relief so as to have at least one circulation groove, which extends over at least a portion of said bottom, the two cups being assembled to one another in a fluid-tight manner, on either side of said central partition, so that the respective concave portions of the two cups are oriented toward one another and each circulation groove forms with said central partition at least one circulation channel, to circulate a heat-transfer fluid, the two cups and the central partition being made of a thermally conductive material, the first of two ends of each circulation channel of the front cup, respectively of the rear cup, being in fluid communication with the outlet connector, respectively the inlet connector of said deflector and the second end of each circulation channel of the front cup being connected to the second end of one of the circulation channels of the rear cup, via an opening drilled in said central partition, so that said heat-transfer fluid can circulate from the inlet connector to the outlet connector through the set of circulation channels while flowing on both sides of said central partition, wherein the bottom of the front cup and the bottom of the rear cup are configured in relief so as to form respectively a peripheral annular collection groove and a peripheral annular distribution groove, which extends around said circulation grooves, the two cups being assembled on either side of the central partition so that the collection groove and the distribution groove form with said central partition respectively a collection channel and a distribution channel, the inlet connector leading into said distribution channel and the outlet connector leading into said collection channel, said distribution and collection channels also each being provided with a deflecting partition which allows the heat-transfer fluid to be guided from the distribution channel to the circulation channels of the rear cup and respectively from the circulation channels of the front cup to the collection channel.

2. The deflector according to claim 1, wherein the circulation channel or channels of the front cup and the circulation channel or channels of the rear cup are symmetrical with respect to a symmetry plane passing through said central partition so that the heat-transfer fluid circulates in the circulation channel or channels of the front cup counter-flow to the direction wherein the heat-transfer fluid circulates in a circulation channel or channels of the rear cup, situated facing the circulation channel or channels of the front cup.

3. The deflector according to any one of claims 1 to 2, wherein the circulation channel or channels are in the form of a spiral.

4. The deflector according to any one of claims 1 to 2, wherein the circulation channel or channels are in the form of a coil.

5. The deflector according to any one of claims 1 to 2, wherein the circulation channel or channels have a rectilinear shape.

6. The deflector according to claim 1, wherein the front and rear cups comprise at least two circulation channels disposed wound side by side in a spiral and inside which the heat-transfer fluid circulates in parallel, wherein the first ends of said circulation channels of the front cup lead into the collection channel and wherein the first ends of said circulation channels of the rear cup lead into the distribution channel.

7. A condensation heat exchanger comprising at least one bundle having a tube or a group of tubes disposed end to end, wound into a helix, said tube or group of tubes being made of a thermally conductive material, said bundle being mounted fixedly inside a gas-tight shell, said shell being provided with a gas discharge sleeve, at least one heat-transfer fluid to be heated, circulating inside said tube bundle, the exchanger also comprising a deflector disposed at an end of said bundle of at least one tube or interleaved between two of these adjoining bundles, and means for conveying or means of producing hot gases, wherein said deflector comprises a front cup, a rear cup, a flat central partition, an inlet connector and an outlet connector, each cup comprising a bottom surrounded by a peripheral rim, an interior face of the bottom of each cup being configured in relief so as to have at least one circulation groove, which extends over at least a portion of said bottom, the two cups being assembled to one another in a fluid-tight manner, on either side of said central partition, so that the respective concave portions of the two cups are oriented toward one another and each circulation groove forms with said central partition at least one circulation channel, wherein the heat-transfer fluid is configured to circulate, the two cups and the central partition being made of a thermally conductive material, the first of two ends of each circulation channel of the front cup, respectively of the rear cup, being in fluid communication with the outlet connector, respectively the inlet connector of said deflector and the second end of each circulation channel of the front cup being connected to the second end of one of the circulation channels of the rear cup, via an opening drilled in said central partition, so that said heat-transfer fluid can circulate from the inlet connector to the outlet connector through the set of circulation channels while flowing on both sides of said central partition wherein the bottom of the front cup adn the bottom of the rear cup are configured in relief so as to form respectively a peripheral annular collection groove and a peripheral annular distribution groove, which extends around said circulation grooves, the two cups being assembled on either side of the central partition so that the collection groove and the distribution groove form with said central partition respectively a collection channel and a distribution channel, the inlet connector leading into said distribution channel and the outlet connector leading into said collection channel said distribution and collection channels also each being provided with a deflecting partition which allows the heat-transfer fluid to be guided from the distribution channel to the circulation channels of the rear cup and respectively from the circulation channels of the front cup to the collection channel, and wherein the deflector and said means of conveying or means of producing hot gases are disposed so that said hot gases lick the exterior face of the front cup of the deflector then pass radially or approximately radially through the bundle of tubes or of groups of tubes situated upstream of said deflector by passing through 4e-gaps separating its turns, from the interior to the exterior of the helix and finally lick the exterior face of the rear cup of said deflector, before being discharged through said gas discharge sleeve.

8. The exchanger according to claim 7, wherein the outlet connector of said deflector is in fluid communication with at least one of the tube bundles, so that it is the same heat-transfer fluid that circulates in the deflector and in the tube bundle.

9. The exchanger according to claim 7, wherein the outer diameter of the deflector is identical or substantially identical to the outer diameter of the tube bundle and wherein the length between and end of the inlet connector and an end of the outlet connector of the deflector is identical or substantially identical to the length between two ends of the orifices of the tube of each tube bundle.

10. The exchanger according to one of claims 7 to 9, wherein the deflector is interleaved between two bundles of tubes or of groups of tubes, the bundle situated upstream of the deflector serving as a primary exchanger and the bundle situated downstream of the deflector with respect to the flow direction of hot gases serving as a secondary exchanger, so that the hot gases lick the exterior face of the front cup of the deflector, then pass radially or approximately radially through the bundle of tubes or of groups of tubes of the primary exchanger by passing through the gaps separating its turns, from the interior to the exterior, then subsequently pass radially or approximately radially through the bundle of tubes or of groups of tubes of the secondary exchanger by passing through the gaps separating its turns, from the exterior to the interior, and finally lick the exterior face of the rear cup of said deflector before being discharge through said gas discharge sleeve.

11. The exchanger according to one of claims 7 to 9, wherein the wall of the tube of a tube bundle has a flattened oval straight section of which the major axis is perpendicular, or approximately perpendicular, to that of the helix, while the width of the gap separating two adjoining turns is constant and smaller than the thickness of said straight section.

* * * * *